(No Model.)

W. S. OSBORN.
METHOD OF COOLING BUTTER.

No. 259,907. Patented June 20, 1882.

WITNESSES
Emory H. Bates.
James J. Sheehy

INVENTOR
Walter S. Osborn
By Theodore Munger
his ATTORNEY

N. PETERS. Photo-Lithographer. Washington. D. C.

UNITED STATES PATENT OFFICE.

WALTER S. OSBORN, OF TOLEDO, OHIO.

METHOD OF COOLING BUTTER.

SPECIFICATION forming part of Letters Patent No. 259,907, dated June 20, 1882.

Application filed June 6, 1881. (No model.)

*To all whom it may concern:*

Be it known that I, WALTER S. OSBORN, of Toledo, in the county of Lucas and State of Ohio, have invented a certain Improvement in Methods of Cooling Butter, of which the following is a specification.

My invention relates to the handling of butter in large quantities in bulk during the heated season, and has for its object the rapid and uniform cooling or tempering of the butter while in bulk, so that it may be promptly assorted, reworked, and repacked without injury to the grain, and, as a result, enabling butter to be handled from four to six days earlier than otherwise, and so preventing the deterioration in quality which occurs when butter in bulk remains so long a time heated.

Butter is usually by the local country dealer packed without assorting and shipped to the market or to wholesale dealers or jobbers in kegs or barrels. The annexed drawings show my invention as embodied in and applied to butter packed in a barrel.

Figure 1:
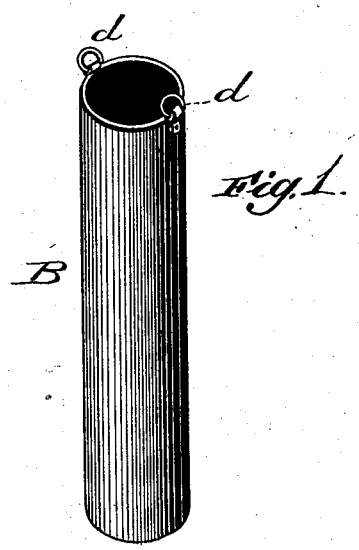
Figure 2:
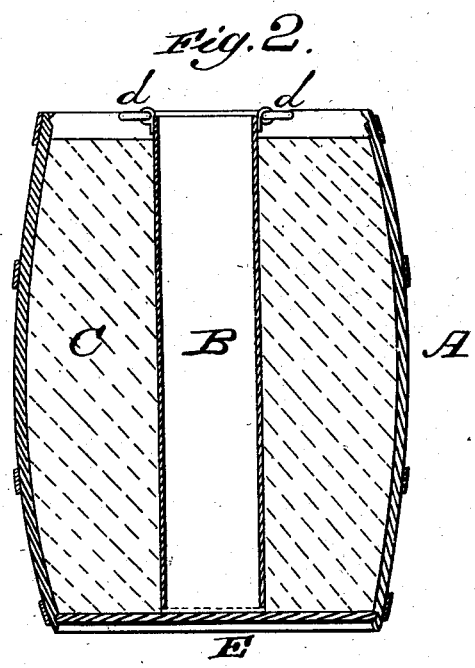
Figure 3:
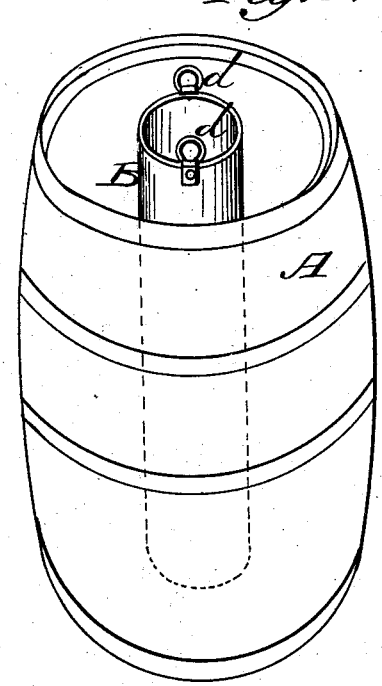

Figure 1 is an elevation of a hollow cylinder open at both ends. Fig. 2 is a side elevation of a vertical section of a barrel into which the cylinder is inserted. Fig. 3 is an elevation of barrel with cylinder inserted.

B represents a hollow cylinder open at both ends, and made of galvanized iron of the length of the barrel or keg in which it is to be used, and of the diameter equal to one-third of the diameter of the barrel or keg.

*d d* represent rings or ears attached to the upper end of the cylinder to facilitate handling and operating it.

A represents the perimeter of a barrel or keg.

C represents the butter contents of the barrel or keg.

The length and diameter of the cylinder are to be governed by the length and diameter of the keg or barrel in which the cylinder is to be applied, the relation being as above stated.

When butter comes to the jobber in the heated season (last of May until October) packed in a mass in barrels or large tubs, as ninety per cent. of it is, it has wholly lost its firmness, seldom retains any consistency, and is most often so melted as to run with readiness to a level, the temperature of the mass varying from 68° to 80° Fahrenheit. By methods now practiced by jobbers in handling butter it is taken to a cooling-room at 55° Fahrenheit and permitted to remain until the mass in the barrel or tub has throughout reached that temperature, requiring from four to six days time. To take it to a colder room would, by the time the interior was sufficiently cool, reduce the outer portion to a degree at which it could not be worked, and its temperature would then have to be again raised, resulting in delay and injury to the butter. The method of emptying barrels and tubs into shallow vats for cooling is less satisfactory and economical in results than the other method described.

In the use of the apparatus I have invented the barrels and tubs of butter on being received are removed at once to the cooling-room, (55° Fahrenheit,) the head of barrel or tub is removed, the cylinder B is then inserted downward through the center of the barrel until it has reached and sets firmly on the bottom, as shown in Fig. 2. The butter inside the cylinder is then removed by means of a ladle. After a period of about two hours the butter immediately around the cylinder will become sufficiently cooled to permit the removal of the cylinder. There is then left through the center of the barrel a hollow, which admits of the access of the cold air to the butter. The cubical contents of the cylinder are less than one-seventh of the contents of the barrel or tub.

By the application of this process the cold air has to penetrate but one sixth of the distance which it otherwise would have to do to cool the whole mass. As a result of this, the butter is produced in a much better condition for working, is uniform in its temperature, the texture and sweetness (which, in being removed from barrel to vat while still heated and soft for the purpose of cooling, or in being permitted to remain a great length of time untouched, and yet but slowly cooling, would be greatly injured) are preserved, and the quality and value of the butter greatly increased and the cost of handling diminished. Butter thus handled with this apparatus may be sufficiently cooled in twelve to fifteen hours, and to a degree which by ordinary methods would require from four to six days.

A transportable refrigerator composed of a cask-like case having a removable concentric ice-chamber is not new. A central ice-chamber adapted to be placed in a bucket or tub is also old; and a milk-pan adapted to be immersed in water, and having a permanent central cooling-tube, has been used prior to my invention, and I claim neither of these constructions broadly herein.

Having thus fully described my invention, I claim—

The herein-described process of cooling butter in bulk, consisting in inserting vertically into the center of the mass of butter in the package a metallic cylinder or tube open at both ends, removing the butter incased in the tube, then removing the tube from the mass of butter, and then subjecting it to a temperature of about 55° Fahrenheit for a period of about twelve hours, substantially as specified.

W. S. OSBORN.

Attest:
MARY J. OSBORN,
FANNIE OSBORN.